(12) United States Patent
Nan

(10) Patent No.: US 9,146,857 B2
(45) Date of Patent: Sep. 29, 2015

(54) METHOD FOR MAPPING MANAGEMENT

(75) Inventor: Yen Chih Nan, Hsinchu (TW)

(73) Assignee: Storart Technology Co. Ltd., Hsinchu (TW)

(*) Notice: Subject to any disclaimer, the term of this patent is extended or adjusted under 35 U.S.C. 154(b) by 131 days.

(21) Appl. No.: 13/589,119

(22) Filed: Aug. 18, 2012

(65) Prior Publication Data

US 2014/0052898 A1 Feb. 20, 2014

(51) Int. Cl.
*G06F 12/02* (2006.01)

(52) U.S. Cl.
CPC .... *G06F 12/0246* (2013.01); *G06F 2212/7201* (2013.01)

(58) Field of Classification Search
CPC ............... G06F 2212/8201; G06F 12/0246; G06F 3/0679; G06F 2212/7201; G06F 12/02
USPC ........................................................ 711/103
See application file for complete search history.

(56) References Cited

U.S. PATENT DOCUMENTS

| 8,756,361 | B1* | 6/2014 | Carlson et al. ............ 711/4 |
| 2005/0021904 | A1* | 1/2005 | Iaculo et al. ............ 711/103 |
| 2007/0255924 | A1* | 11/2007 | Moyer et al. ............ 711/202 |
| 2010/0115182 | A1* | 5/2010 | Murugesan ............ 711/103 |
| 2011/0029808 | A1* | 2/2011 | Moshayedi ............ 714/6 |
| 2011/0161621 | A1* | 6/2011 | Sinclair et al. ............ 711/207 |
| 2012/0096217 | A1* | 4/2012 | Son et al. ............ 711/103 |

* cited by examiner

*Primary Examiner* — Aimee Li
*Assistant Examiner* — Alex Olson
(74) *Attorney, Agent, or Firm* — Che-Yang Chen; Law Office of Michael Chen

(57) ABSTRACT

A method for mapping management is disclosed. The steps of the method comprises sending data from a host; programming a host data a non-volatile storage device; updating a mapping address to a Physical Entry to Logical (PE2L) mapping table stored in a SRAM; updating a Physical Entry (PE) status table; checking if the PE2L mapping table is full; if no, loop to the step of programming a non-violate storage device; if yes, remove invalid entries in the PE2L mapping table and update the PE status table, and then run next step; transferring part of the PE2L mapping table to a Logical to Physical (L2P) mapping table stored in the non-volatile storage device; and programming the L2P mapping table to the non-volatile storage device and looping to the step of removing invalid entries in the PE2L mapping table and updating the PE status table.

2 Claims, 4 Drawing Sheets

METHOD FOR MAPPING MANAGEMENT

FIELD OF THE INVENTION

The present invention provides a method for mapping management, especially for a manage mapping in page mapping algorithm.

BACKGROUND OF THE INVENTION

In page mapping algorithm, how to manage data mapping is important. A large SRAM is needed to get better performance. If it would reduce SRAM size to cost down, storing data mapping to a non-volatile storage device every time is necessary and the performance would be dropped.

SUMMARY OF THE INVENTION

An objective of this invention is providing a method for mapping management, which is capable of removing an invalid data mapping in SRAM on-time to release more space for valid data, and using a few SRAMs of a controller to reduce the stored data mapping frequency and then improving the performance.

To achieve above objectives, a method for mapping management, the steps comprising:

sending data from a host;

programming a host data to a non-volatile storage device;

updating a mapping address to a Physical Entry to Logical (PE2L) mapping table stored in a SRAM;

updating a Physical Entry (PE) status table stored in the SRAM;

checking if the PE2L mapping table is full; if no, loop to the step of programming a non-volatile storage device; if yes, remove invalid entries in the PE2L mapping table and update the PE status table, and then run next step;

transferring part of the PE2L mapping table to a Logical to Physical (L2P) mapping table stored in the non-volatile storage device; and programming the L2P mapping table to the non-volatile storage device and looping to the step of removing invalid entries in the PE2L mapping table and updating the PE status table.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
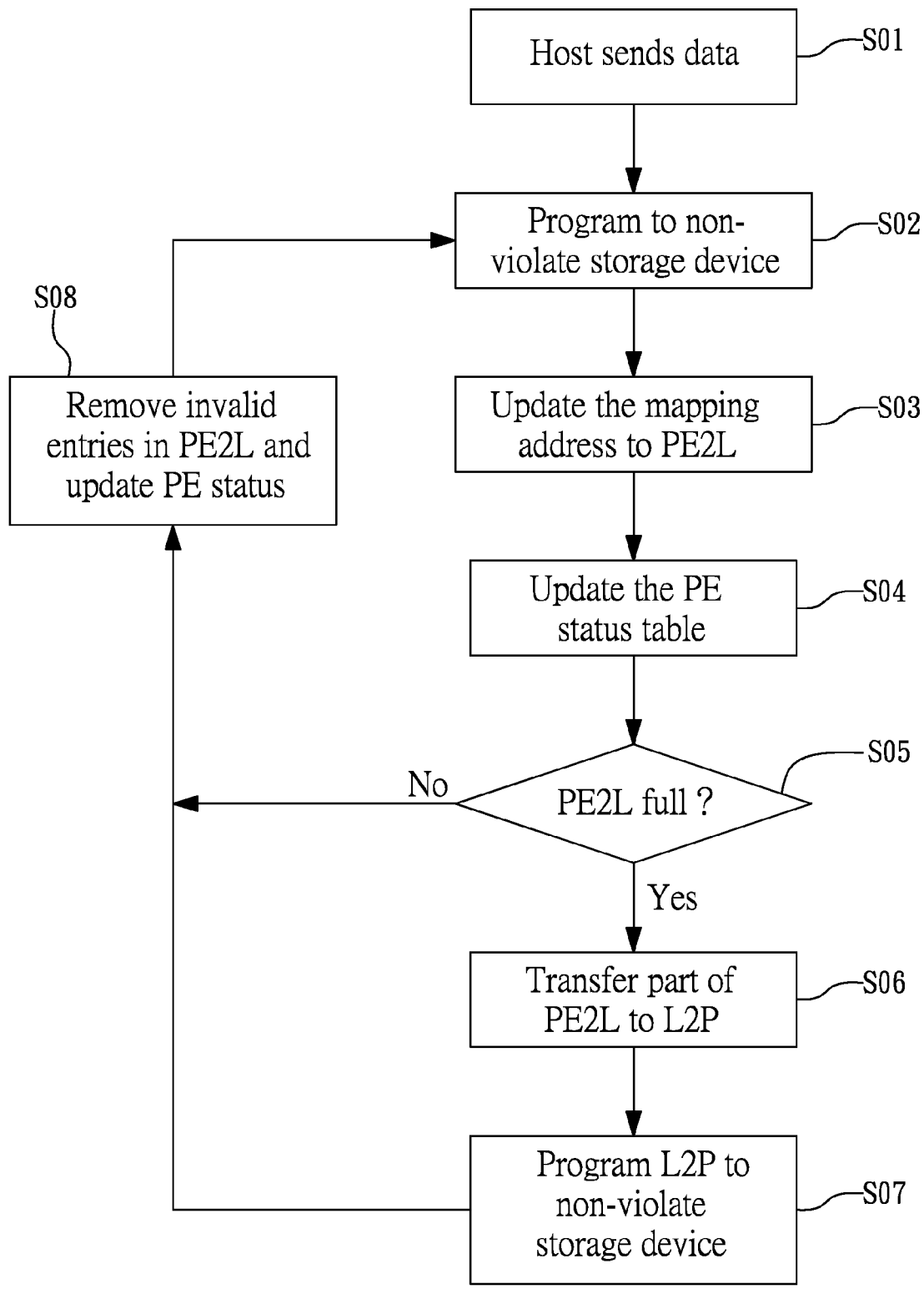
FIG. 1 is illustrated a flowchart showing a method for mapping management according to the present invention

Referring now to the drawings where like characteristics and features among the various figures are denoted by like reference characters.

Please refer to FIG. 1, which is a flowchart showing a method for mapping management according to the present invention.

The steps for the process of a method for mapping management according to the present invention are:

step S01: sending data from a host;

step S02: programming a host data to a non-volatile storage device;

step S03: updating a mapping address to a Physical Entry to Logical (PE2L) mapping table stored in a SRAM;

step S04: updating a Physical Entry (PE) status table stored in the SRAM;

step S05: checking if the PE2L mapping table is full; if no, remove invalid entries in the PE2L mapping table and update the PE status table (step S08) and then loop to step S02;

step S06: if yes, transferring part of the PE2L mapping table to a Logical to Physical (L2P) mapping table stored in the non-volatile storage device; and step S07: programming the L2P mapping table to the non-volatile storage device and then looping to S08.

Wherein, the non-volatile storage device may be a flash memory, but not limited thereto.

There are two kinds of mapping tables, which are PE2L (Physical Entry to Logical) mapping table and PE (Physical Entry) status table. The PE2L mapping table may record the logical address for valid physical entry that its entry mapping has not stored in the non-volatile storage device. And the PE status table may record the mapping information stored in the PE2L mapping table (stored in SRAM) or collected to the L2P (Logical to Physical) mapping table (stored in non-volatile storage device). Every physical entry has two bits to indicate the entry status.

Figure 2:
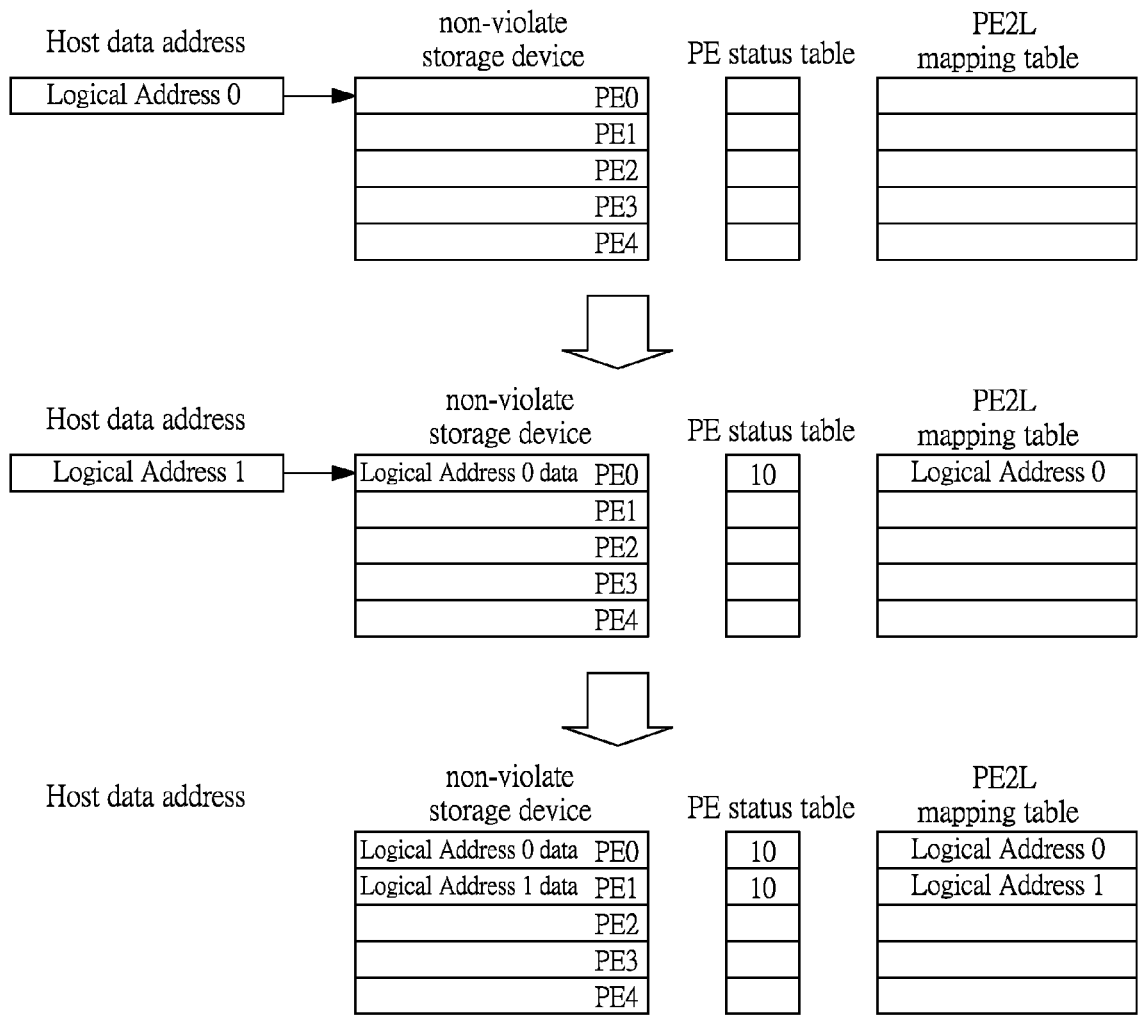
FIG. 2 is an example while starting to data mapping according to the present invention.

Please refer to FIG. 2, which is an example while starting to data mapping according to the present invention.

FIG. 2 shows when controller receives the first data from host, it will program the data to the PE0 of non-volatile storage device and update the PE2L mapping table at the same time. Then it will continue receive the second data from host and repeat the same steps.

The PE2L mapping table only records the logical address of the valid physical entry. In PE status table, each 2 bits represent 1 physical entry. Bit0 means the mapping information is in PE2L mapping table or in L2P mapping table. Bit1 means the physical entry data is valid or invalid. There are the three kinds of status in this table:

(1). 00: The physical entry is invalid. It can be ignored.
(2). 10: The physical entry is valid and the mapping information is in PE2L mapping table.
(3). 11: The physical entry is valid and the mapping information is in L2P mapping table.

In FIG. 2, when the controller programs the host data to the non-volatile storage device, it may update the address to the PE2L mapping table and fill "10" in the PE status table.

Figure 3:
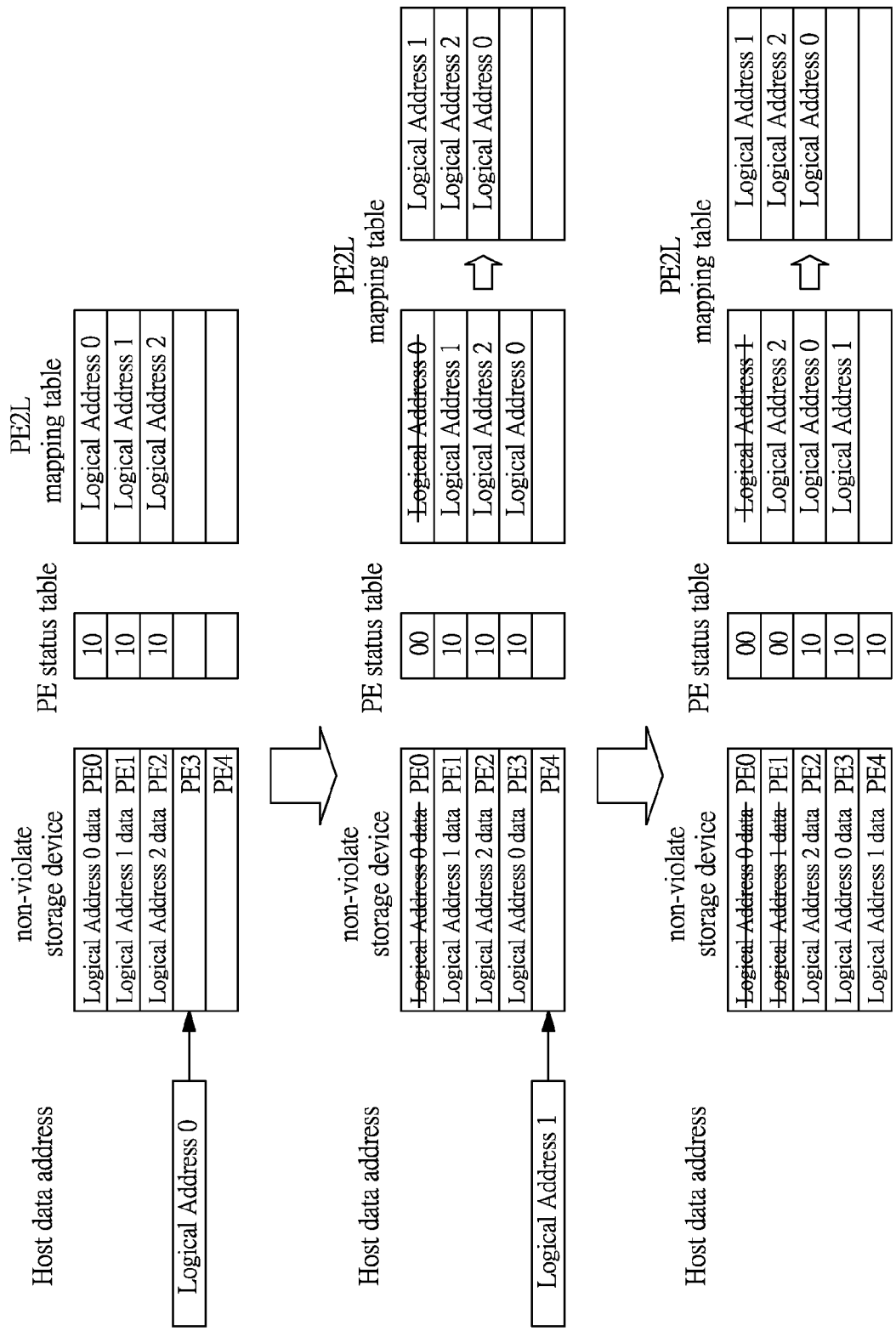
FIG. 3 is an example while the host repeats program data to the same logical address according to the present invention.

Please refer to FIG. 3, which is an example while the host repeats program data to the same logical address according to the present invention.

When the host repeats program data to the same logical address, the previous programmed data in the non-volatile storage device is invalid. The invalid entry mapping will occupy a space in PE2L mapping table. If the invalid mapping can be removed, there will be more space for controller to manage data. The concept is as FIG. 3 shows. If the host program new data in logical address 0 in PE3, the previous program in PE0 will be invalid. The controller sets the status of PE0 to "00", which means invalid physical entry data, and removes it from PE2L mapping table. Then it will set the status of PE3 to valid data and update the logical address 0 to PE2L mapping table. If the host continues programming logical address 1 in PE4, the previous program in PE1 will be invalid. The controller will clean the mapping information of PE2 and update it in PE4. Remove invalid entry from PE2L can much improve the efficiency of SRAM capacity.

PE2L can't store whole device entry mapping at the same time so we need a mechanism to clean PE2L mapping table. When the PE2L mapping table is full, the controller will collect the information of the neighbor logical entries and move the information to non-volatile storage device together. It will release more SRAM at the same time for future data used.

Figure 4:
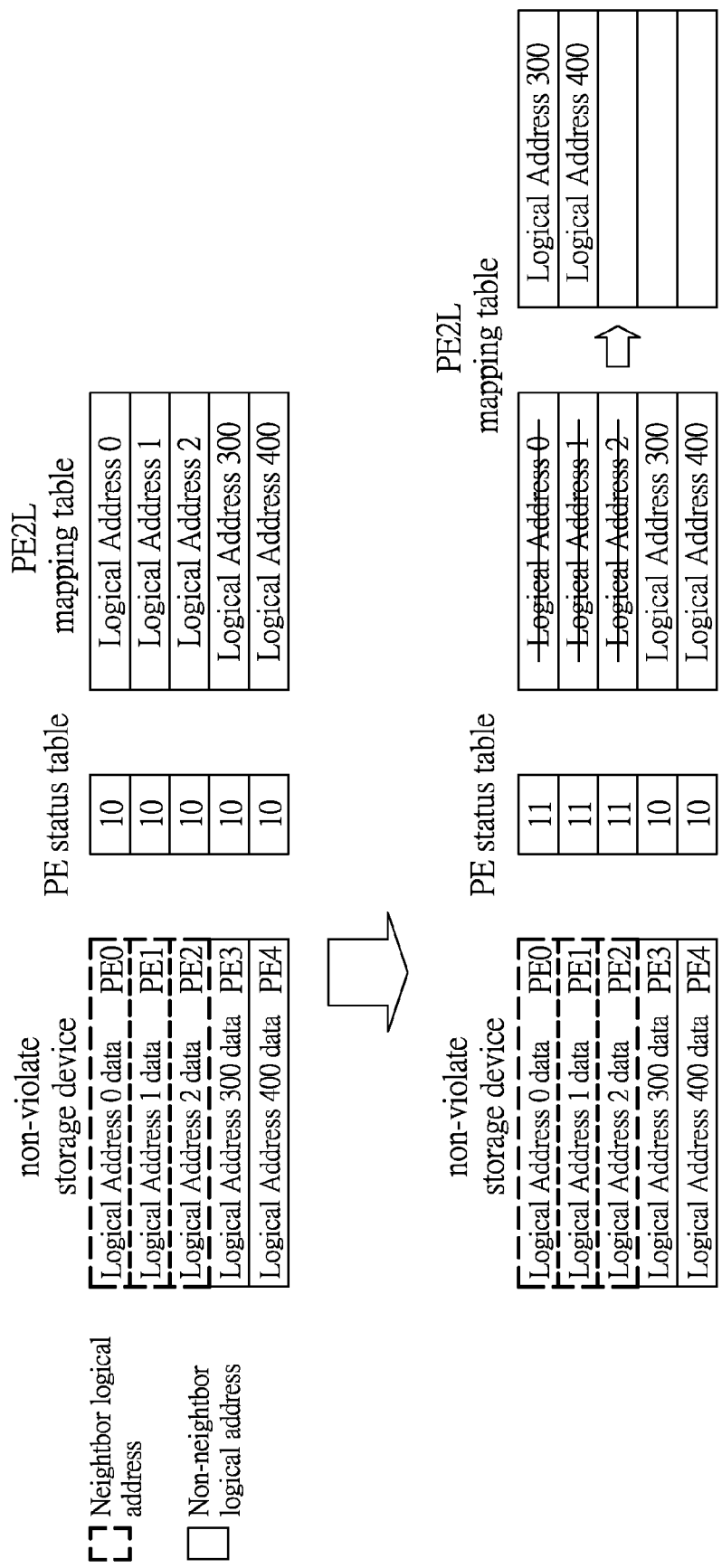
FIG. 4 is an example while releasing PE2L mapping table and updating the corresponding status according to the present invention.

Please refer to FIG. 4, which is an example while releasing PE2L mapping table and updating the corresponding status according to the present invention.

In FIG. 4, it shows the steps of releasing PE2L mapping table and updates the corresponding status. The controller finds the logical address in PE0, PE1, and PE2 which are the neighbored logical addresses. These three entries are transferred to the L2P mapping table at the same time. After moving the mapping information to the L2P mapping table, the status of these three physical entries is changed to "11" which means it is valid physical entry and data mapping is in the L2P mapping table. And the mapping information is also removed from PE2L mapping table.

Therefore, the mapping table is based on valid physical entries, instead of the whole physical entry location. When the physical entries become invalid, the remained logical mapping of valid physical entries is shifted to cover the logical mapping of invalid physical entries in PE2L. By this method, the mapping table can be used efficiently. The controller may reduce the mapping table switch time with less SRAM size and then improve write data performance.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A method for mapping management, comprising the steps of:
    sending data from a host;
    programming a host data to a non-volatile storage device;
    updating a mapping address to a Physical Entry to Logical (PE2L) mapping table stored in a SRAM;
    updating a Physical Entry (PE) status table stored in the SRAM;
    checking if the PE2L mapping table is full; if no, remove invalid entries in the PE2L mapping table and update the PE status table stored in the SRAM; if yes, transferring part of the PE2L mapping table to a Logical to Physical (L2P) mapping table stored in the non-volatile storage device; and
    programming the L2P mapping table to the non-volatile storage device only while the PE2L mapping table is full and looping to the step of removing invalid entries in the PE2L mapping table and updating the PE status table.

2. The method as claimed in claim 1, wherein the non-volatile storage device is a flash memory.

* * * * *